US012213221B1

(12) United States Patent
Zheng

(10) Patent No.: US 12,213,221 B1
(45) Date of Patent: Jan. 28, 2025

(54) ELECTRODELESS DICHROMATIC FLICKERING BULB AND LIGHT-EMITTING-DIODE LIGHT STRING

(71) Applicant: Dianqing Zheng, Dongguan (CN)

(72) Inventor: Dianqing Zheng, Dongguan (CN)

( * ) Notice: Subject to any disclaimer, the term of this patent is extended or adjusted under 35 U.S.C. 154(b) by 0 days.

(21) Appl. No.: 18/894,006

(22) Filed: Sep. 24, 2024

Related U.S. Application Data

(63) Continuation of application No. 18/659,040, filed on May 9, 2024.

(30) Foreign Application Priority Data

Mar. 12, 2024 (CN) ......................... 202420478532.5

(51) Int. Cl.
*H05B 45/40* (2020.01)
*H05B 45/3577* (2020.01)
*H05B 45/3578* (2020.01)
*H05B 45/48* (2020.01)

(52) U.S. Cl.
CPC ..... *H05B 45/3577* (2020.01); *H05B 45/3578* (2020.01); *H05B 45/48* (2020.01)

(58) Field of Classification Search
CPC .... H05B 45/40; H05B 45/48; H05B 45/3574; H05B 45/3577; H05B 45/3578; F21K 9/232; F21K 9/238; F21K 9/278
See application file for complete search history.

(56) References Cited

U.S. PATENT DOCUMENTS 8,502,468 B2 * 8/2013 Li ............................. F21K 9/23 362/249.02
9,395,051 B2 * 7/2016 Hussell ...................... F21V 5/10
9,681,511 B1 * 6/2017 Barbosa ................. H05B 45/40
9,810,379 B2 * 11/2017 Hussell .................... F21V 23/06
10,890,299 B2 * 1/2021 Ye ........................... F21K 9/232
11,293,596 B1 * 4/2022 Wang ....................... F21K 9/238
2009/0278463 A1 * 11/2009 Tang .................... H05B 47/165 361/115
2013/0127353 A1 * 5/2013 Athalye ................. H05B 45/35 315/193
2015/0084511 A1 * 3/2015 McRae .................. H05B 47/20 315/122
2015/0252955 A1 * 9/2015 Boschetto ............. F21V 23/002 362/249.02
(Continued)

*Primary Examiner* — Tung X Le
(74) *Attorney, Agent, or Firm* — Bayramoglu Law Offices LLC

(57) ABSTRACT

An electrodeless dichromatic flickering bulb includes: a built-in chip, a first light-emitting-diode element and a second light-emitting-diode element; the built-in chip includes a first input terminal, a second input terminal, a first output terminal and a second output terminal, the first input terminal is electrically connected to the first output terminal, and the second input terminal is electrically connected to the second output terminal; an anode of the first light-emitting-diode element is electrically connected to the first output terminal, a cathode of the first light-emitting-diode element is electrically connected to the second input terminal, an anode of the second light-emitting-diode element is electrically connected to the second output terminal, and a cathode of the second light-emitting-diode element is electrically connected to the first input terminal.

10 Claims, 6 Drawing Sheets

(56) References Cited

U.S. PATENT DOCUMENTS

2017/0292692 A1* 10/2017 Chen .................... F21V 23/006
2023/0213154 A1* 7/2023 Lee ........................ F21K 9/238
362/249.01

* cited by examiner

ELECTRODELESS DICHROMATIC FLICKERING BULB AND LIGHT-EMITTING-DIODE LIGHT STRING

CROSS REFERENCE TO THE RELATED APPLICATIONS

This application is the continuation application of U.S. application Ser. No. 18/659,040 filed on May 9, 2024, which is based upon and claims foreign priority to Chinese Patent Application No. 202420478532.5, filed on Mar. 12, 2024, the entire contents of which are incorporated herein by reference.

TECHNICAL FIELD

The present disclosure relates to the technical field of light fixture, and particularly relates to an electrodeless dichromatic flickering bulb and a light-emitting-diode light string.

BACKGROUND

Currently, light-emitting-diode flickering lights and light strings are being extensively applied in construction, squares, roads, residences and so on, to provide bright visual effects and build merry festival atmosphere for those locations.

Currently, in order to realize the effect of flickering of the light-emitting-diode light string, usually the light-emitting-diode light string is equipped with an electrodeless dichromatic flickering bulb. The electrodeless dichromatic flickering bulb includes 2 driving chips and 2 voltage stabilizing diodes, to support the demands on flickering in different scenes.

However, quantities of the driving chips and the voltage stabilizing diodes used by the above-described electrodeless dichromatic flickering bulb are large, or, in other words, the above-described electrodeless dichromatic flickering bulb has a complicated structure, which results that the production process steps of the electrodeless dichromatic flickering bulb are complicated, thus increasing the manufacturing cost of the light-emitting-diode light string, and reducing the production efficiency of the light-emitting-diode light string.

SUMMARY

In order to solve or partially solve the above problems, the present disclosure discloses an electrodeless dichromatic flickering bulb and a light-emitting-diode light string, to solve the problems of light-emitting-diode light strings in the prior art of a high manufacturing cost and a low production efficiency.

In order to solve the above problems, in the first aspect, an embodiment of the present disclosure provides an electrodeless dichromatic flickering bulb, wherein the electrodeless dichromatic flickering bulb includes:

- a built-in chip, a first light-emitting-diode element and a second light-emitting-diode element;
- the built-in chip includes a first input terminal, a second input terminal, a first output terminal and a second output terminal, the first input terminal is electrically connected to the first output terminal, and the second input terminal is electrically connected to the second output terminal;
- an anode of the first light-emitting-diode element is electrically connected to the first output terminal, a cathode of the first light-emitting-diode element is electrically connected to the second input terminal, an anode of the second light-emitting-diode element is electrically connected to the second output terminal, and a cathode of the second light-emitting-diode element is electrically connected to the first input terminal; and
- when the first input terminal is powered on, the first light-emitting-diode element emits light, and when the second input terminal is powered on, the second light-emitting-diode element emits light.

In the second aspect, the light-emitting-diode light string includes a plurality of light-emitting-diode light groups sequentially connected in series, and at least one of the plurality of light-emitting-diode light groups includes at least one instance of the electrodeless dichromatic flickering bulb in the first aspect.

Optionally, the light-emitting-diode light string further includes a power-supply adapter and a light-string controller electrically connected to an output terminal of the power-supply adapter;

- an input terminal of the power-supply adapter is configured to be connected to a mains supply network, the light-string controller includes an electricity inputting terminal and a signal outputting terminal, and the electricity inputting terminal is electrically connected to the output terminal of the power-supply adapter; and
- the signal outputting terminal includes at least two output terminal points, one of the at least two output terminal points is connected to a first light-emitting-diode light group among the plurality of light-emitting-diode light groups, and the other of the at least two output terminal points is connected to a last light-emitting-diode light group among the plurality of light-emitting-diode light groups.

Optionally, the light-string controller includes at least one of a hand-pressed controller, a foot-operated controller, an infrared remotely controlling controller, a wireless-video remotely controlling controller, a Bluetooth remotely controlling controller and a wireless-fidelity remotely controlling controller.

Optionally, the plurality of light-emitting-diode light groups are arranged in a predetermined-shaped pattern.

Optionally, the predetermined-shaped pattern is any one of a strip shape, an annular shape, a character shape and an outer-object-contour shape.

Optionally, the signal outputting terminal includes a first output terminal point and a second output terminal point; and

- each of the light-emitting-diode light groups includes a forward-reverse-direction lamp bead and the electrodeless dichromatic flickering bulb that are connected in parallel, the first input terminal point is connected to the first light-emitting-diode light group among the plurality of light-emitting-diode light groups, and the second input terminal point is connected to the last light-emitting-diode light group among the plurality of light-emitting-diode light groups.

Optionally, the signal outputting terminal includes a third output terminal point, a fourth output terminal point, a fifth output terminal point and a sixth output terminal point;

- the light-emitting diode light string includes a first light string and a second light string, the first light string includes a plurality of flickering-bulb light groups sequentially connected in series, the second light string includes a plurality of continuously-lightening-bulb light groups sequentially connected in series, each of the flickering-bulb light groups includes a plurality of electrodeless dichromatic flickering bulbs connected in parallel, and each of the continuously-lightening-bulb light groups includes a plurality of forward-reverse-direction lamp beads connected in parallel;

the third output terminal point is connected to a first continuously-lightening-bulb light group among the plurality of continuously-lightening-bulb light groups, and the fourth output terminal point is connected to a last continuously-lightening-bulb light group among the plurality of continuously-lightening-bulb light groups; and the fifth output terminal point is connected to a first flickering-bulb light group among the plurality of flickering-bulb light groups, and the sixth output terminal point is connected to a last flickering-bulb light group among the plurality of flickering-bulb light groups.

Optionally, the light-emitting-diode light group includes a plurality of electrodeless dichromatic flickering bulbs connected in parallel.

Optionally, the light-emitting-diode light group includes a forward-reverse-direction lamp bead and the electrodeless dichromatic flickering bulb that are connected in parallel, and a quantity of the forward-reverse-direction lamp bead and a quantity of the electrodeless dichromatic flickering bulb are at a predetermined ratio.

In the embodiments of the present disclosure, the built-in chip includes the first input terminal, the second input terminal, the first output terminal and the second output terminal, the first input terminal is electrically connected to the first output terminal, the second input terminal is electrically connected to the second output terminal, the anode of the first light-emitting-diode element is electrically connected to the first output terminal, the cathode of the first light-emitting-diode element is electrically connected to the second input terminal, the anode of the second light-emitting-diode element is electrically connected to the second output terminal, and the cathode of the second light-emitting-diode element is electrically connected to the first input terminal. Therefore, when the first input terminal is powered on, the first output terminal is caused to be powered on, so that the anode of the first light-emitting-diode element electrically connected to the first output terminal is powered on, whereby the first light emitting diode emits light. When the second input terminal is powered on, the second output terminal is caused to be powered on, so that the anode of the second light-emitting-diode element electrically connected to the second output terminal is powered on, whereby the second light emitting diode emits light. In conclusion, in the embodiments of the present disclosure, the electrodeless dichromatic flickering bulb can realize the effect of multi-effect flickering by using merely one built-in chip, and does not require a voltage regulator tube, which can reduce the production cost of the electrodeless dichromatic flickering bulb, and increase the production efficiency.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are embodiments of the present disclosure, and a person skilled in the art can obtain other figures according to these figures without paying creative work.

DESCRIPTION OF THE REFERENCE NUMBERS

1: light-emitting-diode light group; 2: first light string; 3: second light string; 4: power-supply adapter; 5: light-string controller; 21: electrodeless dichromatic flickering bulb; 31: forward-reverse-direction lamp bead; 51: electricity inputting terminal; 52: signal outputting terminal; 211: built-in chip; 212: first light-emitting-diode element; 213: second light-emitting-diode element; 2111: first input terminal: 2112: second input terminal; 2113: first output terminal; and 2114: second output terminal.

DETAILED DESCRIPTION OF THE EMBODIMENTS

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be understood that the "one embodiment" or "an embodiment" as used throughout the description means that particular features, structures or characteristics with respect to the embodiments are included in at least one embodiment of the present disclosure. Therefore, the "in one embodiment" or "in an embodiment" as used throughout the description does not necessarily refer to the same embodiment. Furthermore, those particular features, structures or characteristics may be combined in one or more embodiments in any suitable form.

Figure 1:
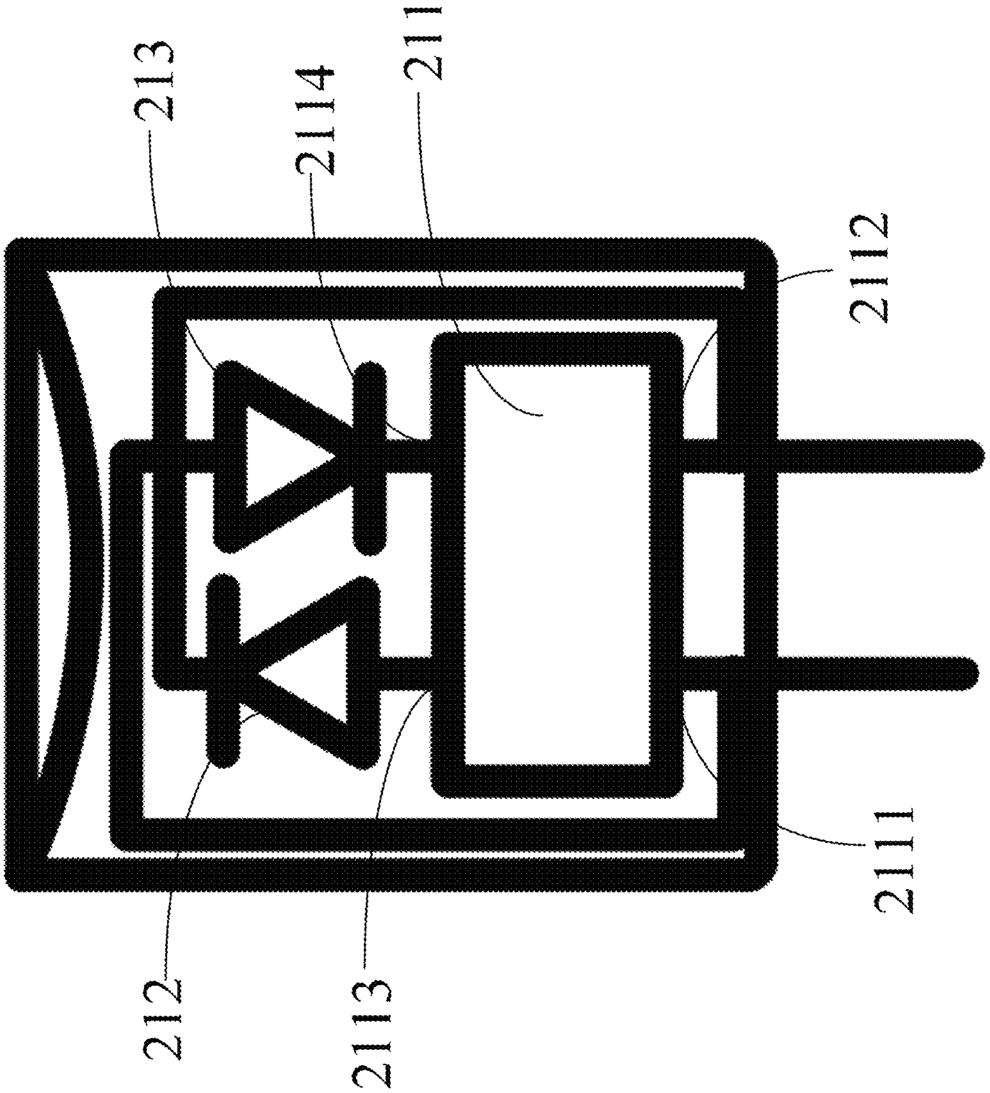
FIG. 1 is a first schematic structural diagram of an electrodeless dichromatic flickering bulb according to an embodiment of the present disclosure.

In the first aspect, an embodiment of the present disclosure provides an electrodeless dichromatic flickering bulb. FIG. 1 is a schematic structural diagram of an electrodeless dichromatic flickering bulb according to an embodiment of the present disclosure. As shown in FIG. 1, the electrodeless dichromatic flickering bulb includes:

a built-in chip 211, a first light-emitting-diode element 212 and a second light-emitting-diode element 213.

The built-in chip 211 includes a first input terminal 2111, a second input terminal 2112, a first output terminal 2113 and a second output terminal 2114, the first input terminal 2111 is electrically connected to the first output terminal 2113, and the second input terminal 2112 is electrically connected to the second output terminal 2114.

The anode of the first light-emitting-diode element 212 is electrically connected to the first output terminal 2113, the cathode of the first light-emitting-diode element 212 is electrically connected to the second input terminal 2112, the anode of the second light-emitting-diode element 213 is electrically connected to the first input terminal 2111, and the cathode of the second light-emitting-diode element 213 is electrically connected to the second output terminal 2114.

When the first input terminal 2111 is powered on, the first light-emitting-diode element 212 emits light, and when the second input terminal 2112 is powered on, the second light-emitting-diode element 213 emits light.

It can be seen from the above embodiments that, in the embodiments of the present disclosure, the built-in chip 211 includes the first input terminal 2111, the second input terminal 2112, the first output terminal 2113 and the second output terminal 2114, the first input terminal 2111 is electrically connected to the first output terminal 2113, the second input terminal 2112 is electrically connected to the second output terminal 2114, the anode of the first light-emitting-diode element 212 is electrically connected to the first output terminal 2113, the cathode of the first light-emitting-diode element 212 is electrically connected to the second input terminal 2112, the anode of the second light-emitting-diode element 213 is electrically connected to the first input terminal 2111, and the cathode of the second light-emitting-diode element 213 is electrically connected to the second output terminal 2114. Therefore, when the first input terminal 2111 is powered on, the first output terminal 2113 is caused to be powered on, so that the anode of the first light-emitting-diode element 212 electrically connected to the first output terminal 2113 is powered on, whereby the first light emitting diode emits light. When the second input terminal 2112 is powered on, the second output terminal 2114 is caused to be powered on, so that the cathode of the second light-emitting-diode element 213 electrically connected to the second output terminal 2114 is powered on, whereby the second light emitting diode emits light. In conclusion, in the embodiments of the present disclosure, the electrodeless dichromatic flickering bulb can realize the effect of multi-effect flickering by using merely one built-in chip 211, and does not require a voltage regulator tube, which can reduce the production cost of the electrodeless dichromatic flickering bulb, and increase the production efficiency.

It should be noted that, in the above embodiment, the built-in chip 211 may be any one of a light-emitting-diode chip, an encapsulated chip and a controlling chip, which is not limited in the embodiments of the present disclosure. Taking the controlling chip as an example, the controlling chip may be any one of chips such as a light-emitting-diode driving chip, an intelligent controlling chip and a sensor chip. The light-emitting-diode driving chip may control the emitted-light brightnesses and colors of the first light-emitting-diode element 212 and the second light-emitting-diode element 213. The intelligent controlling chip may implement the functions such as intelligent interconnection. The sensor chip may sense the variation of the ambient environment. The application of those chips enables the electrodeless dichromatic flickering bulb to be more intelligent and energy-saving, which satisfies the demands on high-quality illumination of people.

In addition, both of the first light-emitting-diode element 212 and the second light-emitting-diode element 213 emit light by recombination between electrons and holes to release energy. Taking the first light-emitting-diode element 212 as an example, the core part of the first light-emitting-diode element 212 is a wafer formed by a P-type semiconductor and an N-type semiconductor, and between the P-type semiconductor and the N-type semiconductor there is a transition layer referred to as a PN junction. When the injected minority carriers and majority carriers recombine, the excessive energy is released in the form of light, thereby directly converting the electric energy into light energy. If the PN junction is applied a reverse voltage, the minority carriers have difficulty in being injected, whereby it does not emit light. When the first light-emitting-diode element 212 is in the forward-direction operating state (in other words, the two terminals are applied a forward voltage), when the electric current is flowing from the anode of the first light-emitting-diode element 212 to the cathode of the first light-emitting-diode element 212, the semiconductor crystal emits light rays of different colors from ultraviolet to infra-red, wherein the light intensity is related to the electric current. In other words, in the embodiments of the present disclosure, merely when the first input terminal 2111 of the built-in chip 211 is powered on, the first output terminal 2113 has a forward-direction current input, so that the electric current flows from the anode of the first light-emitting-diode element 212 to the cathode, whereby the first light-emitting-diode element 212 emits light. However, because the second input terminal 2112 is electrically connected to the cathode of the first light-emitting-diode element 212, when the second input terminal 2112 of the built-in chip 211 is powered on, the PN junction of the first light-emitting-diode element 212 is applied a reverse voltage, and the minority carriers have difficulty in being injected, whereby the first light-emitting-diode element 212 does not emit light. The operation principle of the second light-emitting-diode element 213 is the same as the above-described operation principle of the first light-emitting-diode element 212, and is not discussed further in the embodiments of the present disclosure.

Figure 2:
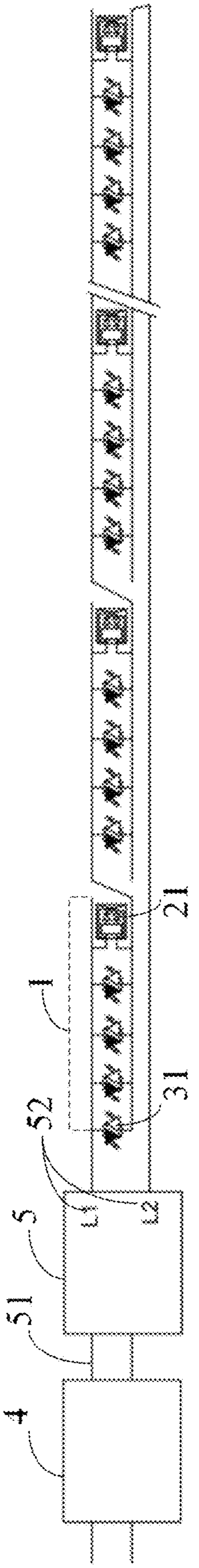
FIG. 2 is a schematic structural diagram of a first type of light-emitting-diode light string according to an embodiment of the present disclosure.
Figure 3:
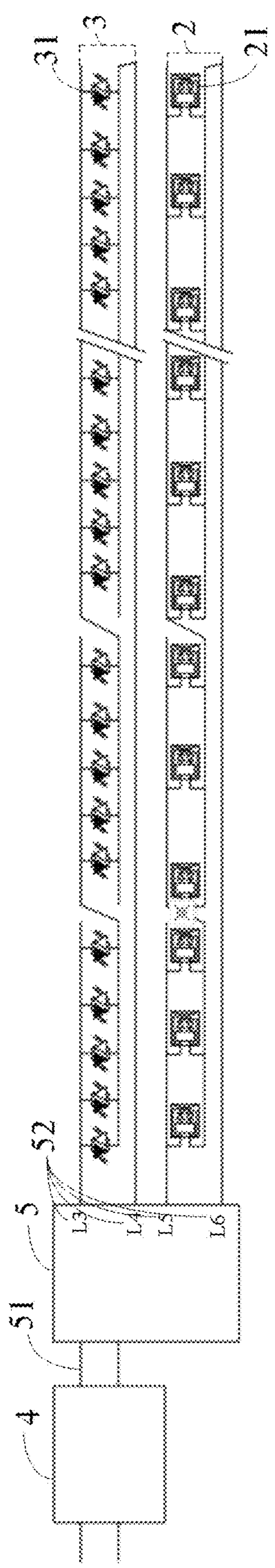
FIG. 3 is a schematic structural diagram of a second type of light-emitting-diode light string according to an embodiment of the present disclosure.
Figure 4:
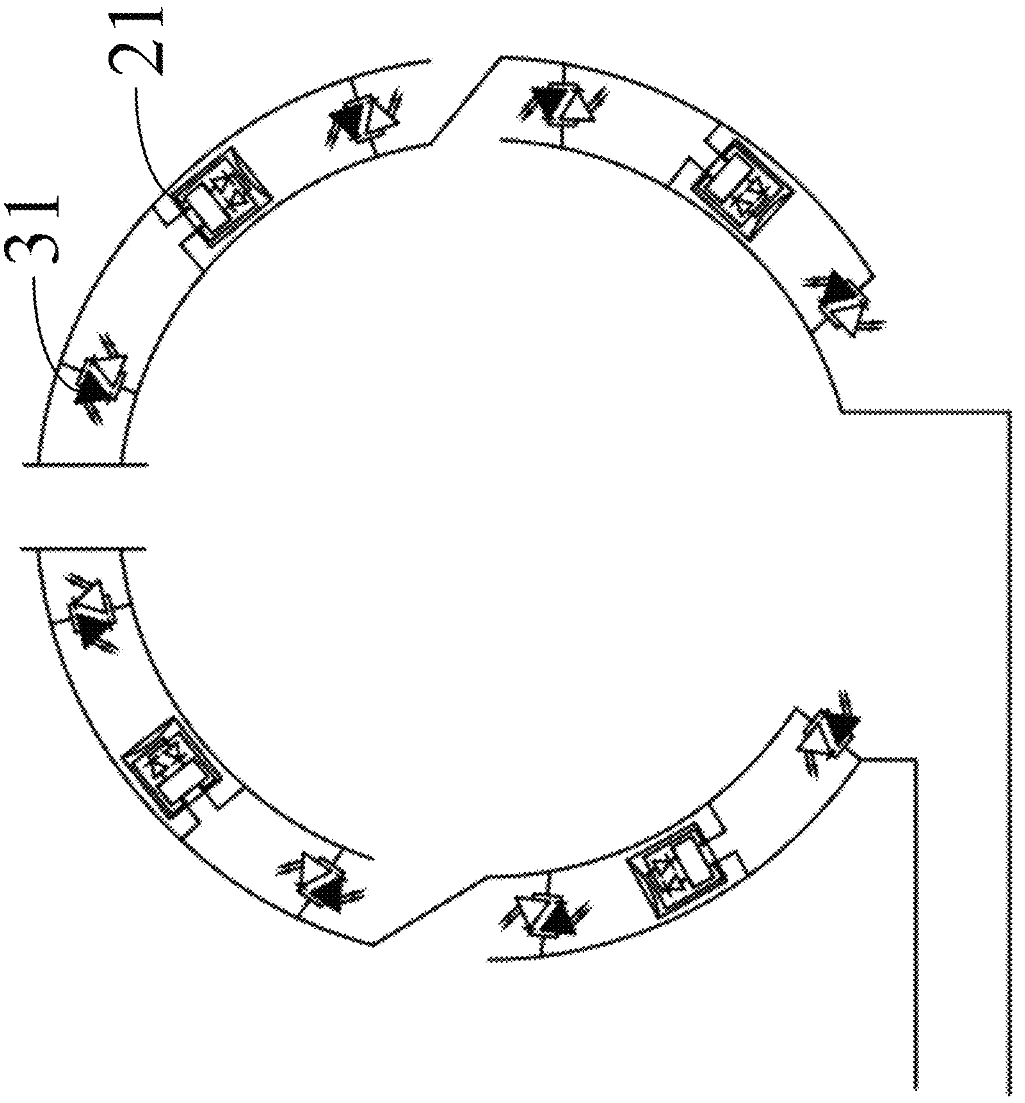
FIG. 4 is a fourth schematic structural diagram of a third type of light-emitting-diode light string according to an embodiment of the present disclosure.

In the second aspect, an embodiment of the present disclosure further provides a light-emitting-diode light string. As shown in FIGS. 2 to 4, the light-emitting-diode light string includes a plurality of light-emitting-diode light groups 1 sequentially connected in series, and at least one of the plurality of light-emitting-diode light groups 1 includes at least electrodeless dichromatic flickering bulb 21 in the first aspect.

It should be noted that, in the above embodiment, the light-emitting-diode light groups 1 included by the light-emitting-diode light string may include merely the electrodeless dichromatic flickering bulb 21; in other words, the whole light-emitting-diode light string is the electrodeless dichromatic flickering bulb 21. The light-emitting-diode light groups 1 included by the light-emitting-diode light string may also include a forward-reverse-direction lamp bead 31 and the electrodeless dichromatic flickering bulb 21 at a certain ratio. Alternatively, some of the light-emitting-diode light groups 1 included by the light-emitting-diode light string are light groups that merely include the electrodeless dichromatic flickering bulb 21, and the other are light groups that merely include the forward-reverse-direction lamp bead 31, which is not limited in the embodiments of the present disclosure. Accordingly, according to the demands on the functions of the light-emitting-diode light string, the light-emitting-diode light strings of different structural compositions can be provided, whereby the lighting effects of the light-emitting-diode light strings are richer and more diversified.

It can be seen from the above embodiments that, because the light-emitting-diode light string includes a plurality of light-emitting-diode light groups 1 sequentially connected in series, and at least one of the plurality of light-emitting-diode light groups 1 includes at least one electrodeless dichromatic flickering bulb 21 in the first aspect, the light-emitting-diode light string has at least the electrodeless dichromatic flickering bulb 21. Further, because the electrodeless dichromatic flickering bulb 21 can realize the effect of multi-effect flickering by using merely one built-in chip 211, and does not require a voltage regulator tube, which reduces the production cost of the electrodeless dichromatic flickering bulb 21, and increases the production efficiency, the production cost of the light-emitting-diode light string can be reduced, and the market competitiveness can be increased correspondingly.

Optionally, regarding the particular structure of the light-emitting-diode light string, in some embodiments, the light-emitting-diode light string further includes a power-supply adapter 4 and a light-string controller 5 electrically connected to the output terminal of the power-supply adapter 4. The input terminal of the power-supply adapter 4 is configured to be connected to a mains supply network, the light-string controller 5 includes an electricity inputting terminal 51 and a signal outputting terminal 52, and the electricity inputting terminal 51 is electrically connected to the output terminal of the power-supply adapter 4. The signal outputting terminal 52 includes at least two output terminal points, one of the at least two output terminal points is connected to the first light-emitting-diode light group 1 among the plurality of light-emitting-diode light groups 1, and the other of the at least two output terminal points is connected to the last light-emitting-diode light group 1 among the plurality of light-emitting-diode light groups 1.

It should be noted that the power-supply adapter 4 is configured to supply the low-voltage direct current required by the light-emitting-diode light string. The input terminal of the power-supply adapter 4 is configured to be connected to a mains supply network. What the mains supply network outputs may be 220-volt single-phase alternating current, and may also be 110-volt single-phase alternating current. The output terminal of the power-supply adapter 4 is configured to be connected to the electricity inputting terminal 51 of the light-string controller 5, and is configured to supply direct current of 6 volts to 36 volts to the light-string controller 5. In addition, the signal outputting terminal 52 of the light-string controller 5 is configured to be electrically connected to the plurality of light-emitting-diode light groups 1. Particularly, the signal outputting terminal 52 may include two output terminal points, may also include four output terminal points, and may also include output terminal points of another even-number quantity, which is not limited in the embodiments of the present disclosure. The signal outputting terminal 52 is configured to, according to the circuit attribute, output a pulse signal of preset variable duty cycle and variable frequency, wherein the pulse signal may also have a variable duty cycle and a constant frequency, or have a constant duty cycle and a variable frequency. Taking the case as an example in which the signal outputting terminal 52 includes two output terminal points, one of the two output terminal points is connected to the first light-emitting-diode light group 1 among the plurality of light-emitting-diode light groups 1, and the other of the two output terminal points is connected to the last light-emitting-diode light group 1 among the plurality of light-emitting-diode light groups 1. Accordingly, when the one of the two output terminal points is powered on, the light emitting diodes that are powered on in the forward direction in the light-emitting-diode light groups 1 emit light, and when the other of the two output terminal points is powered on, the light emitting diodes that are powered on in the reverse direction in the light-emitting-diode light groups 1 emit light.

Optionally, the light-string controller 5 includes at least one of a hand-pressed controller, a foot-operated controller, an infrared remotely controlling controller, a wireless-video remotely controlling controller, a Bluetooth remotely controlling controller and a wireless-fidelity remotely controlling controller.

Figure 5:
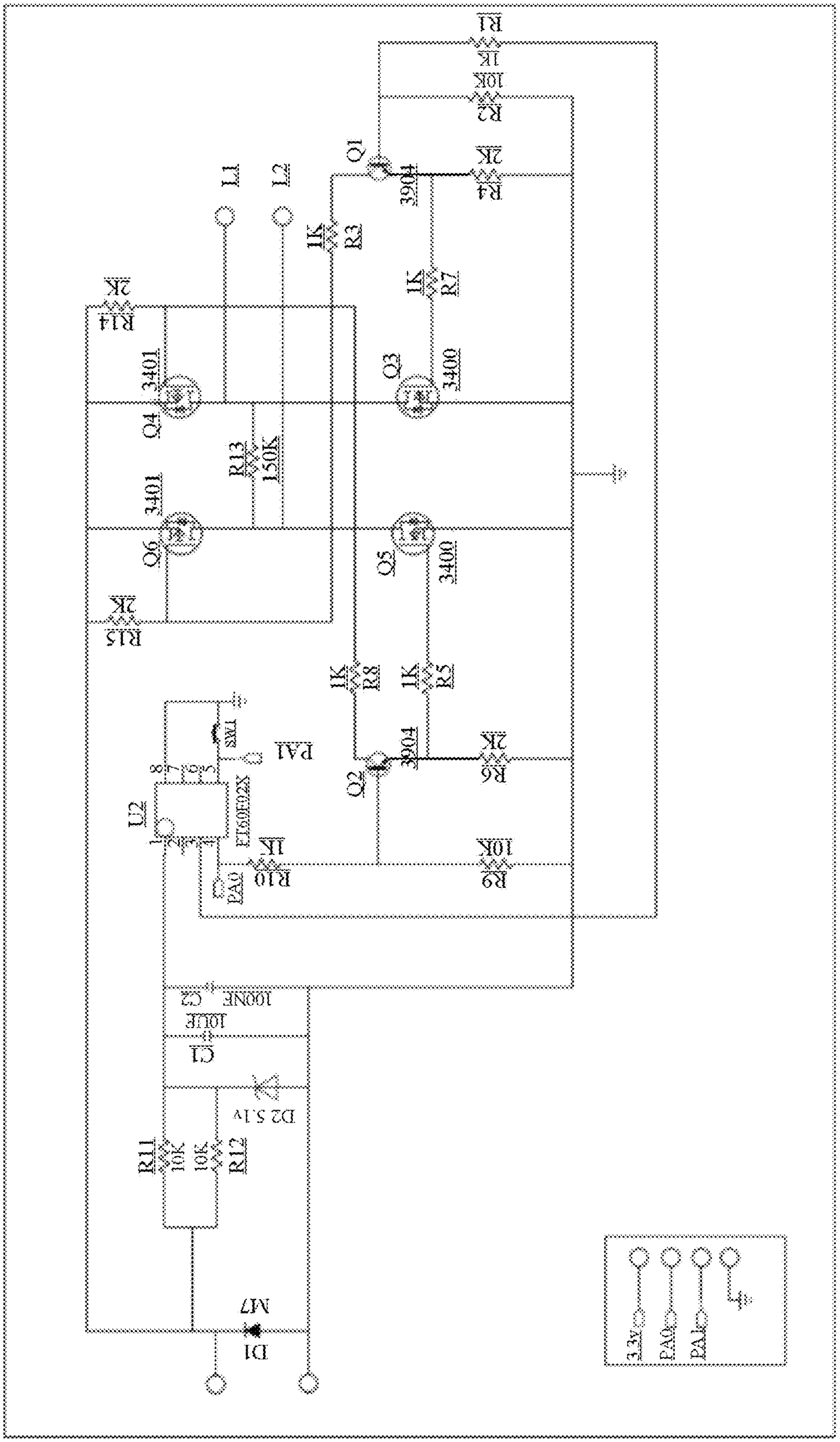
FIG. 5 is a circuit principle diagram of a first type of light-string controller according to an embodiment of the present disclosure.
Figure 6:
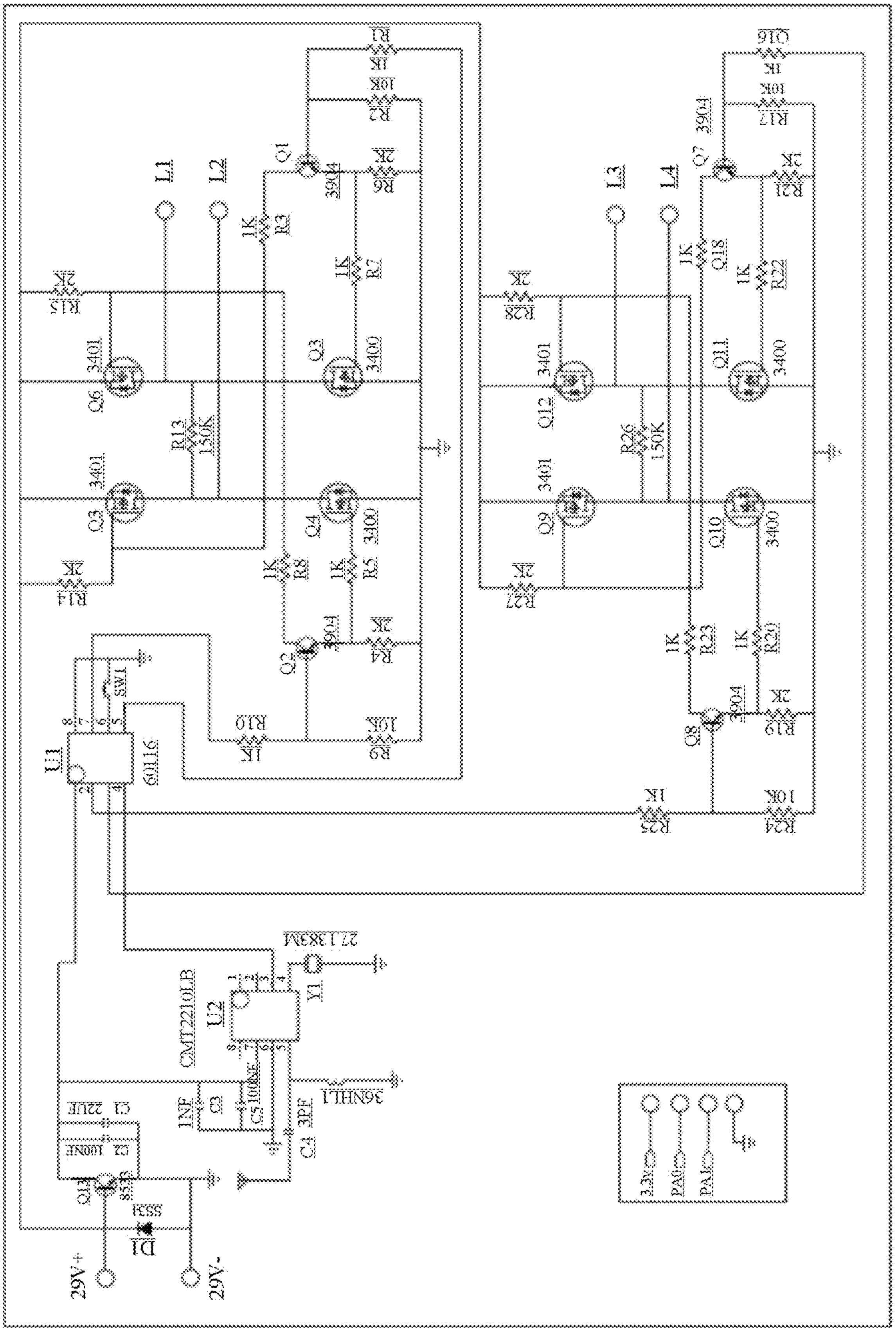
FIG. 6 is a circuit principle diagram of a second type of light-string controller according to an embodiment of the present disclosure.
Figure 7:
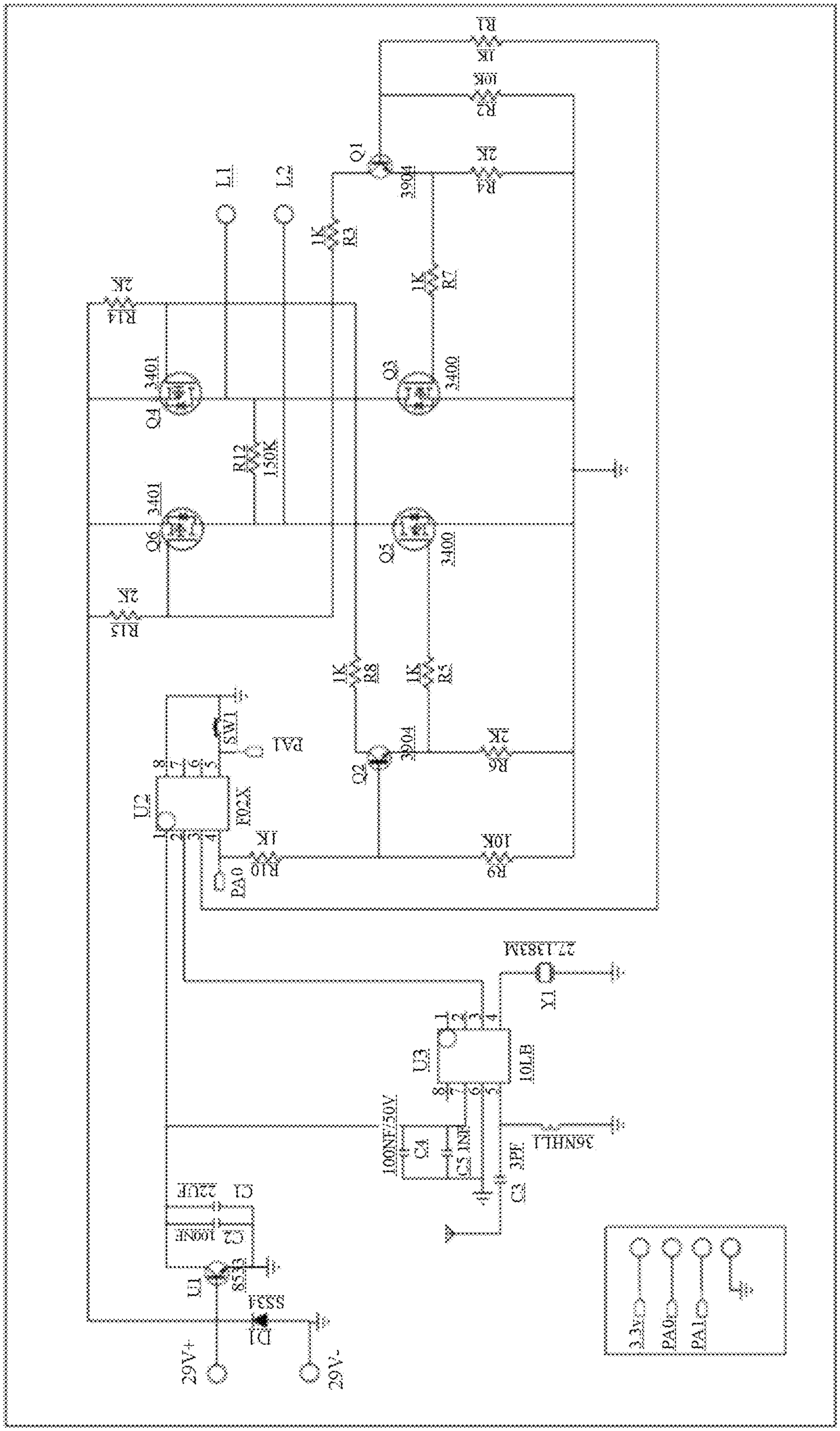
FIG. 7 is a circuit principle diagram of a third type of light-string controller according to an embodiment of the present disclosure.

It should be noted that the circuit diagram of the hand-pressed controller and the foot-operated controller is shown in FIG. 5, and the circuit diagrams of the infrared remotely controlling controller, the wireless-video remotely controlling controller, the Bluetooth remotely controlling controller and the wireless-fidelity remotely controlling controller are shown in FIGS. 6 and 7.

In some embodiments, the plurality of light-emitting-diode light groups 1 are arranged in a predetermined-shaped pattern.

It should be noted that, because the plurality of light-emitting-diode light groups 1 are arranged in the predetermined-shaped pattern, the light-emitting-diode light string can present different predetermined-shaped patterns, so that the light-emitting-diode light string can be adapted for different application scenes, whereby the lighting effects of the light-emitting-diode light strings are richer and more diversified.

Optionally, the predetermined-shaped pattern is any one of a strip shape, an annular shape, a character shape and an outer-object-contour shape. Accordingly, the suitable outer shape contour of the light-emitting-diode light string can be selected based on the application scene of the light-emitting-diode light string.

Regarding the signal controlling of the light-emitting-diode light string, in an alternative implementation, as shown in FIG. 2, the signal outputting terminal 52 includes a first output terminal point and a second output terminal point. Each of the light-emitting-diode light groups 1 includes a forward-reverse-direction lamp bead 31 and the electrodeless dichromatic flickering bulb 21 that are connected in parallel, the first input terminal point is connected to the first light-emitting-diode light group 1 among the plurality of light-emitting-diode light groups 1, and the second input terminal point is connected to the last light-emitting-diode light group 1 among the plurality of light-emitting-diode light groups 1.

It should be noted that the forward-reverse-direction lamp bead 31 may be a forward-direction electrically conducting light-emitting-diode lamp bead and a reverse-direction electrically conducting light-emitting-diode lamp bead that are connect in parallel, and may also be a single bidirectional light-emitting-diode element that brightens in the forward direction and the reverse direction. The emitted-light color of the forward-reverse-direction lamp bead 31 may be white, warm white, red, green, yellow, blue, pink or purple, and may also be other colors, which is not limited in the embodiments of the present disclosure. Based on that, in the signal controlling structure of the light-emitting-diode light string, the first input terminal point is electrically connected to the anode of one of the light emitting diodes in the forward-reverse-direction lamp bead 31 in the first light-emitting-diode light group 1 among the plurality of light-emitting-diode light groups 1 and the first input terminal 2111 of the electrodeless dichromatic flickering bulb 21, and the second input terminal point is electrically connected to the anode of the other of the light emitting diodes in the forward-reverse-direction lamp bead 31 in the last light-emitting-diode light group 1 among the plurality of light-emitting-diode light groups 1 and the second input terminal 2112 of the electrodeless dichromatic flickering bulb 21. Accordingly, when the first input terminal point is powered on, the light emitting diodes that are powered on in the forward direction in the light-emitting-diode light groups 1 emit light, and when the second input terminal point is powered on, the light emitting diodes that are powered on in the reverse direction in the light-emitting-diode light groups 1 emit light. By the driving by the pulse signal of the light-string controller 5, the forward-reverse-direction lamp bead 31 and the electrodeless dichromatic flickering bulb 21 can realize multi-effect flickering, so that the light-emitting-diode light string can realize good effects of decoration and displaying. The first input terminal point is shown by L1 in FIG. 2, and the second input terminal point is shown by L2 in FIG. 2.

Regarding the signal controlling of the light-emitting-diode light string, in another alternative implementation, as shown in FIG. 3, the signal outputting terminal 52 includes a third output terminal point, a fourth output terminal point, a fifth output terminal point and a sixth output terminal point. The light-emitting-diode light string includes a first light string 2 and a second light string 3, the first light string 2 includes a plurality of flickering-bulb light groups sequentially connected in series, the second light string 3 includes a plurality of continuously-lightening-bulb light groups sequentially connected in series, each of the flickering-bulb light groups includes a plurality of electrodeless dichromatic flickering bulbs 21 connected in parallel, and each of the continuously-lightening-bulb light groups includes a plurality of forward-reverse-direction lamp beads 31 connected in parallel. The third output terminal point is connected to the first continuously-lightening-bulb light group among the plurality of continuously-lightening-bulb light groups, and the fourth output terminal point is connected to the last continuously-lightening-bulb light group among the plurality of continuously-lightening-bulb light groups. The fifth output terminal point is connected to the first flickering-bulb light group among the plurality of flickering-bulb light groups, and the sixth output terminal point is connected to the last flickering-bulb light group among the plurality of flickering-bulb light groups.

It should be noted that, in the present embodiment, the light-emitting-diode light string includes two types of the light strings, i.e., the light string including merely the flickering-bulb light groups and the light string including merely the continuously-lightening-bulb light groups, to further enrich the lighting effects of the light-emitting-diode light string. Particularly, in the above embodiment, the third output terminal point is connected to the first continuously-lightening-bulb light group among the plurality of continuously-lightening-bulb light groups, and the fourth output terminal point is connected to the last continuously-lightening-bulb light group among the plurality of continuously-lightening-bulb light groups. Accordingly, when the third input terminal point is powered on, the light emitting diodes that are powered on in the forward direction in the continuously-lightening-bulb light groups emit light, and when the fourth input terminal point is powered on, the light emitting diodes that are powered on in the reverse direction in the continuously-lightening-bulb light groups emit light. The fifth output terminal point is connected to the first flickering-bulb light group among the plurality of flickering-bulb light groups, and the sixth output terminal point is connected to the last flickering-bulb light group among the plurality of flickering-bulb light groups. Accordingly, when the fifth input terminal point is powered on, the first light emitting diodes that are in the same circuit as the first input terminal 2111 in the flickering-bulb light groups emit light, and the second light emitting diodes that are in the same circuit as the second input terminal 2112 in the flickering-bulb light groups emit light. Accordingly, by the alternate controlling of the flickering-bulb light groups and the continuously-lightening-bulb light groups, more types of the effects of lamplight flickering can be realized. In addition, if any one of the first light string 2 and the second light string 3 is damaged, the normal displaying of the other light string is not affected, which reduces the failure rate of the lamplight displaying, and facilitates the subsequent repairment. The third input terminal point is shown by L3 in FIG. 3, the fourth input terminal point is shown by L4 in FIG. 3, the fifth input terminal point is shown by L5 in FIG. 3, and the sixth input terminal point is shown by L6 in FIG. 3.

Regarding the structural composition of the light-emitting-diode light groups 1, in an alternative implementation, the light-emitting-diode light string includes a plurality of electrodeless dichromatic flickering bulbs 21 connected in parallel. In the present embodiment, the light-emitting-diode light string includes merely the electrodeless dichromatic flickering bulbs 21, and thus may be applied in application scenes that merely require the electrodeless dichromatic flickering bulbs 21.

Regarding the structural composition of the light-emitting-diode light groups 1, in another alternative implementation, the light-emitting-diode light group 1 includes a forward-reverse-direction lamp bead 31 and the electrodeless dichromatic flickering bulb 21 that are connected in parallel, and the quantity of the forward-reverse-direction lamp bead 31 and the quantity of the electrodeless dichromatic flickering bulb 21 is at a predetermined ratio. In the present embodiment, the predetermined ratio may be decided according to practical demands, for example, 2:1, 3:1 and 4:1, which is not limited in the embodiments of the present disclosure. Accordingly, according to the demands on the functions of the light-emitting-diode light string, the light-emitting-diode light strings of different structural compositions can be provided, whereby the lighting effects of the light-emitting-diode light strings are richer and more diversified.

It can be seen from the above embodiments that, because the light-emitting-diode light string includes a plurality of light-emitting-diode light groups 1 sequentially connected in series, and at least one of the plurality of light-emitting-diode light groups 1 includes at least one electrodeless dichromatic flickering bulb 21 in the first aspect, the light-emitting-diode light string has at least the electrodeless dichromatic flickering bulb 21. Further, because the electrodeless dichromatic flickering bulb 21 can realize the effect of multi-effect flickering by using merely one built-in chip 211, and does not require a voltage regulator tube, which reduces the production cost of the electrodeless dichromatic flickering bulb 21, and increases the production efficiency, the production cost of the light-emitting-diode light string can be reduced, and the market competitiveness can be increased correspondingly. In addition, in the embodiments of the present disclosure, the light-emitting-diode light string can be configured at any ratio, so that the light-emitting-diode light string is applied extensively.

The embodiments of the description are described in the mode of progression, each of the embodiments emphatically describes the differences from the other embodiments, and the same or similar parts of the embodiments may refer to each other.

Although preferable embodiments of the embodiments of the present disclosure have been described, once a person skilled in the art has known the essential inventive concept, he may make further variations and modifications on those embodiments. Therefore, the appended claims are intended to be interpreted as including the preferable embodiments and all of the variations and modifications that fall within the scope of the embodiments of the present disclosure.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or terminal devices. Unless further limitation is set forth, an element defined by the wording "including a . . . " does not exclude additional same element in the process, method, article or terminal device including the element.

The present disclosure has been described in detail above. The principle and the embodiments of the present disclosure are described herein with reference to the particular examples, and the description of the above embodiments is merely intended to facilitate to comprehend the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. An electrodeless dichromatic flickering bulb, comprising:

a built-in chip, a first light-emitting-diode element and a second light-emitting-diode element;

the built-in chip comprises a first input terminal, a second input terminal, a first output terminal and a second output terminal, the first input terminal is electrically connected to the first output terminal, and the second input terminal is electrically connected to the second output terminal;

an anode of the first light-emitting-diode element is electrically connected to the first output terminal, a cathode of the first light-emitting-diode element is electrically connected to the second input terminal, an anode of the second light-emitting-diode element is electrically connected to the first input terminal, and a cathode of the second light-emitting-diode element is electrically connected to the second output terminal; and when the first input terminal is powered on, the first light-emitting-diode element emits light, and when the second input terminal is powered on, the second light-emitting-diode element emits light.

2. A light-emitting-diode light string, comprising a plurality of light-emitting-diode light groups sequentially connected in series, and at least one of the plurality of light-emitting-diode light groups comprises at least one of the electrodeless dichromatic flickering bulb according to claim 1.

3. The light-emitting-diode light string according to claim 2, wherein the light-emitting-diode light string further comprises a power-supply adapter and a light-string controller electrically connected to an output terminal of the power-supply adapter;

an input terminal of the power-supply adapter is configured to be connected to a mains supply network, the light-string controller comprises an electricity inputting terminal and a signal outputting terminal, and the electricity inputting terminal is electrically connected to the output terminal of the power-supply adapter; and the signal outputting terminal comprises at least two output terminal points, one of the at least two output terminal points is connected to a first light-emitting-diode light group among the plurality of light-emitting-diode light groups, and the other of the at least two output terminal points is connected to a last light-emitting-diode light group among the plurality of light-emitting-diode light groups.

4. The light-emitting-diode light string according to claim 3, wherein the light-string controller comprises at least one of a hand-pressed controller, a foot-operated controller, an infrared remotely controlling controller, a wireless-video remotely controlling controller, a Bluetooth remotely controlling controller and a wireless-fidelity remotely controlling controller.

5. The light-emitting-diode light string according to claim 4, wherein the predetermined-shaped pattern is any one of a strip shape, an annular shape, a character shape and an outer-object-contour shape.

6. The light-emitting-diode light string according to claim 3, wherein the signal outputting terminal comprises a first output terminal point and a second output terminal point; and each of the light-emitting-diode light groups comprises a forward-reverse-direction lamp bead and the electrodeless dichromatic flickering bulb that are connected in parallel, the first input terminal point is connected to the first light-emitting-diode light group among the plurality of light-emitting-diode light groups, and the second input terminal point is connected to the last light-emitting-diode light group among the plurality of light-emitting-diode light groups.

7. The light-emitting-diode light string according to claim 3, wherein the signal outputting terminal comprises a third output terminal point, a fourth output terminal point, a fifth output terminal point and a sixth output terminal point;

the light-emitting-diode light string comprises a first light string and a second light string, the first light string comprises a plurality of flickering-bulb light groups sequentially connected in series, the second light string comprises a plurality of continuously-lightening-bulb light groups sequentially connected in series, each of the flickering-bulb light groups comprises a plurality of electrodeless dichromatic flickering bulbs connected in parallel, and each of the continuously-lightening-bulb light groups comprises a plurality of forward-reverse-direction lamp beads connected in parallel;

the third output terminal point is connected to a first continuously-lightening-bulb light group among the plurality of continuously-lightening-bulb light groups, and the fourth output terminal point is connected to a last continuously-lightening-bulb light group among the plurality of continuously-lightening-bulb light groups; and the fifth output terminal point is connected to a first flickering-bulb light group among the plurality of flickering-bulb light groups, and the sixth output terminal point is connected to a last flickering-bulb light group among the plurality of flickering-bulb light groups.

8. The light-emitting-diode light string according to claim 2, wherein the plurality of light-emitting-diode light groups are arranged in a predetermined-shaped pattern.

9. The light-emitting-diode light string according to claim 2, wherein the light-emitting-diode light group comprises a plurality of electrodeless dichromatic flickering bulbs connected in parallel.

10. The light-emitting-diode light string according to claim 2, wherein the light-emitting-diode light group comprises a forward-reverse-direction lamp bead and the electrodeless dichromatic flickering bulb that are connected in parallel, and a quantity of the forward-reverse-direction lamp bead and a quantity of the electrodeless dichromatic flickering bulb are at a predetermined ratio.

* * * * *